US012749779B2

(12) United States Patent
Hu et al.

(10) Patent No.: US 12,749,779 B2
(45) Date of Patent: Sep. 29, 2026

(54) BATTERY CORE ASSEMBLY, BATTERY, BATTERY PACK AND VEHICLE

(71) Applicant: BYD COMPANY LIMITED, Shenzhen (CN)

(72) Inventors: Shichao Hu, Shenzhen (CN); Yan Zhu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 774 days.

(21) Appl. No.: 17/988,053

(22) Filed: Nov. 16, 2022

(65) Prior Publication Data

US 2023/0076552 A1 Mar. 9, 2023

Related U.S. Application Data

(63) Continuation of application No. PCT/CN2021/088456, filed on Apr. 20, 2021.

(30) Foreign Application Priority Data

May 18, 2020 (CN) ......................... 202010422006.3

(51) Int. Cl.

*H01M 50/538* (2021.01)
*H01M 50/289* (2021.01)
*H01M 50/682* (2021.01)

(52) U.S. Cl.

CPC ....... *H01M 50/538* (2021.01); *H01M 50/289* (2021.01); *H01M 50/682* (2021.01); *H01M 2220/20* (2013.01)

(58) Field of Classification Search

CPC ............. H01M 50/538; H01M 50/289; H01M 50/682; H01M 2220/20

See application file for complete search history.

(56) References Cited

U.S. PATENT DOCUMENTS

2006/0166087 A1* 7/2006 Ogata ............... H01M 10/0413 429/153
2012/0058391 A1* 3/2012 Jiang .................. H01M 50/202 429/186
2017/0125769 A1* 5/2017 Yang .................. H01M 50/471

FOREIGN PATENT DOCUMENTS

CN 101662045 A 3/2010
CN 103165940 A 6/2013

(Continued)

OTHER PUBLICATIONS

English Translation of WO 2021/174402 A1 (Year: 2021).*

(Continued)

*Primary Examiner* — Jeffrey T Barton
*Assistant Examiner* — Anna E. Gould
(74) *Attorney, Agent, or Firm* — Sheppard Mullin Richter & Hampton LLP

(57) ABSTRACT

A battery core assembly includes an encapsulation film and multiple electrode core assemblies disposed in the encapsulation film. The electrode core assemblies are connected to form an electrode core string, and each of the electrode core assemblies includes at least one electrode core. A spacer is disposed between two adjacent electrode core assemblies, the first spacer divides an accommodating space inside the encapsulation film into multiple accommodating cavities, cavity walls of the accommodating cavities includes the first spacer and the encapsulation film connected to the first spacer, and the electrode core assemblies are respectively accommodated in the accommodating cavities. The first spacer includes at least one first liquid reservoir, and the at least one first liquid reservoir communicates with one of accommodating cavities on both sides of the first spacer.

21 Claims, 7 Drawing Sheets

(56) References Cited

FOREIGN PATENT DOCUMENTS

| | | | | | |
|---|---|---|---|---|---|
| CN | 103199202 | A | | 7/2013 | |
| CN | 103748707 | A | | 4/2014 | |
| CN | 204144372 | U | | 2/2015 | |
| CN | 206505986 | U | | 9/2017 | |
| CN | 107579174 | A | * | 1/2018 | |
| CN | 108448041 | A | | 8/2018 | |
| CN | 109428125 | A | | 3/2019 | |
| CN | 110048154 | A | | 7/2019 | |
| CN | 110429234 | A | | 11/2019 | |
| CN | 110518156 | A | | 11/2019 | |
| CN | 110518174 | A | | 11/2019 | |
| KR | 2012-0009509 | A | | 1/2012 | |
| KR | 2015-0137841 | A | | 12/2015 | |
| WO | WO-2021174402 | A1 | * | 9/2021 | .......... H01M 50/502 |

OTHER PUBLICATIONS

English translation of CN 107579174 A (Year: 2018).*

International Search Report and Written Opinion for Application No. PCT/CN2021/088456, mailed on Jul. 9, 2021, 9 pages.

* cited by examiner

BATTERY CORE ASSEMBLY, BATTERY, BATTERY PACK AND VEHICLE

CROSS-REFERENCE TO RELATED APPLICATIONS

This application is a continuation application of international patent application No. PCT/CN2021/088456 filed with the China National Intellectual Property Administration (CNIPA) on Apr. 20, 2021, which is based on and claims priority to and benefits of Chinese Patent Application No. 202010422006.3 filed on May 18, 2020. The entire content of all of the above-referenced applications is incorporated herein by reference.

FIELD

The present disclosure relates to the field of batteries, and specifically to a battery core assembly, a battery, a battery pack, and a vehicle.

BACKGROUND

With the continuous popularization of new energy vehicles, the requirements raised for use of power batteries in new energy vehicles are becoming increasingly higher. In particular, the users' requirements for the service life of power batteries becomes increasingly higher. Especially taxi and buses are required to have a service life of more than 1 million kilometers over 5 years. However, a very important factor that affects the battery life is the content of the electrolyte solution in the battery. Sufficient electrolyte solution in the battery can ensure the cycle requirements of the battery, and reduce the occurrence of lithium plating in the battery. However, the conventional pouch battery requires evacuation in the production process, so it is often impossible to design more electrolyte solution inside the battery, causing an insufficient service life of the battery.

SUMMARY

The present disclosure resolves at least one of the technical problems existing in the related art.

To resolve the foregoing technical problem, the technical solutions of the present disclosure are as follows.

In a first aspect, the present disclosure provides a battery core assembly, which includes an encapsulation film and multiple electrode core assemblies disposed in the encapsulation film. The electrode core assemblies are connected to form an electrode core string, and each of the electrode core assemblies includes at least one electrode core. A first spacer is disposed between two adjacent electrode core assemblies, where the first spacer divides an accommodating space inside the encapsulation film into multiple accommodating cavities. Cavity walls of the accommodating cavities includes the first spacer and the encapsulation film connected to the first spacer. The electrode core assemblies are respectively accommodated in the accommodating cavities. The first spacer includes at least one first liquid reservoir, and the at least one first liquid reservoir communicates with one of accommodating cavities on both sides of the first spacer.

In some embodiments of the present disclosure, the at least one first liquid reservoir is recessed from an outer surface of the first spacer to an interior of the first spacer.

In some embodiments of the present disclosure, the outer surface of the first spacer includes a connecting surface and a first outer surface and a second outer surface located on two sides of the connecting surface. The connecting surface is joined to the encapsulation film, and the first outer surface and the second outer surface are respectively located in the accommodating cavities on both sides of the first spacer. A portion of the first outer surface is recessed toward the interior of the first spacer to form the first liquid reservoir, or a portion of the second outer surface is recessed toward the interior of the first spacer to form the first liquid reservoir, or a portion of the first outer surface and a portion of the second outer surface are both recessed toward the interior of the first spacer to form the first liquid reservoir. Multiple reinforcing ribs are disposed in the first liquid reservoir, to divide the first liquid reservoir into multiple liquid storage units.

In some embodiments of the present disclosure, a length of the electrode core assemblies extends along a first direction, the electrode core assemblies are disposed along the first direction, each of the electrode core assemblies includes two electrode lead-out members for outputting currents, and the two electrode lead-out members are respectively disposed at two ends of each of the electrode core assemblies in the first direction. An electrode connection hole is provided on the first spacer, two electrode lead-out members of two adjacent electrode core assemblies having opposite polarities are connected, and the two electrode lead-out members of the two adjacent electrode core assemblies are connected in the electrode connection hole on the first spacer between the two adjacent electrode core assemblies.

In some embodiments of the present disclosure, a length of the at least one electrode core extends along the first direction, and a thickness of the at least one electrode core extends along a second direction perpendicular to the first direction. The electrode core assembly includes at least two electrode cores connected and arranged along the second direction.

In some embodiments of the present disclosure, two adjacent electrode cores are connected in parallel, and each of the at least two electrode cores includes an electrode core body and two tabs of opposite polarities that are electrically connected to the electrode core body, the two tabs are respectively arranged on two opposite sides of the electrode core body in the first direction, tabs with a same polarity of the two adjacent electrode cores are located on a same side in the first direction, two adjacent tabs with the same polarity are electrically connected, and the two adjacent electrode cores are connected in parallel. The electrode core assembly further includes a tab support disposed between the two adjacent tabs with a same polarity and is connected to the two adjacent tabs with the same polarity. The tab support is electrically connected to one of the two electrode lead-out members and one of the two adjacent tabs that have the same polarity.

In some embodiments of the present disclosure, the tab support is connected to the one of the two electrode lead-out members and the one of the two adjacent tabs on different surfaces of the tab support.

In some embodiments of the present disclosure, the tab support includes two opposite first surfaces, and the two first surfaces respectively face the two adjacent tabs with the same polarity and are respectively attached to the two adjacent tabs with a same polarity.

In some embodiments of the present disclosure, at least one tab support connected with an electrode lead-out member is a square piece, and the square piece includes the two first surfaces, a third surface located between the two first surfaces and facing the electrode core body, and a fourth surface opposite to the third surface, and the at least one tab support is connected to the electrode lead-out member through the fourth surface.

In some embodiments of the present disclosure, the tab support includes a hollow cavity, the hollow cavity has an opening in at least one of the cavity walls, the opening communicates with one of the accommodating cavities where the tab support is positioned, and the hollow cavity forms a second liquid reservoir.

In some embodiments of the present disclosure, at least one tab support is a U-shaped piece, an opening of the U-shaped piece is oriented parallel to the first direction. The U-shaped piece includes two opposite side walls and a bottom wall between the two opposite side walls, and outer surfaces of the two opposite side walls are the two first surfaces respectively.

In some embodiments of the present disclosure, the opening of the U-shaped piece faces the electrode core body, and the tab support electrically connected to the electrode lead-out member through the bottom wall.

In some embodiments of the present disclosure, the opening of the U-shaped piece faces a first spacer on a same side, and the tab support is electrically connected to the electrode lead-out member through one of the two opposite side walls.

In some embodiments of the present disclosure, an insulating spacer is disposed between the tab support and the electrode core body.

In some embodiments of the present disclosure, the two opposite ends of the electrode core body in the first direction are V-shaped ends with a tip protruding outward, the two tabs of each of the two adjacent electrode cores are respectively located at tips of two V-shaped ends, and a V-shaped space is formed between V-shaped ends of the two adjacent electrode core bodies at a same end in the first direction. The insulating spacer is a V-shaped piece matching a shape of the V-shaped space, and the V-shaped piece is coupled in the V-shaped space.

In some embodiments of the present disclosure, an angle of the V-shaped space is 90-150 degrees. The insulating spacer is fixed to the tab support by a snap mechanism.

In some embodiments of the present disclosure, a second spacer is further disposed at each of two ends of the electrode core string and includes an electrode lead-out hole, a first one of electrode lead-out members of an electrode core assembly at a first end of the electrode core string passes through the electrode lead-out hole on the second spacer at the first end, and a second one of the electrode lead-out members of an electrode core assembly at a second end of the electrode core string passes through the electrode lead-out hole on the second spacer at the second end. The second spacer includes a second liquid reservoir, the second liquid reservoir is recessed from an outer surface of the second spacer to the interior of the second spacer, the second liquid reservoir on the second spacer communicates with one of the accommodating cavities in which an electrode core assembly is located, and the second liquid reservoir on the second spacer and the electrode core assembly are located at the same end of the electrode core string.

In some embodiments of the present disclosure, at least one tab support in the electrode core assembly at at least one end of the electrode core string includes a hollow cavity, the hollow cavity has an opening in at least one of the cavity walls to communicate with the electrode lead-out hole on the second spacer at a same end, and the hollow cavity forms a third liquid reservoir.

In some embodiments of the present disclosure, the second spacer at one end of the electrode core string is mounted around the electrode core assembly at the same end.

In a second aspect, the present disclosure provides a battery, which includes a casing, and at least one battery core assembly disposed in the casing, where the at least one battery core assembly is any battery core assembly as described above.

In a third aspect, the present disclosure provides a battery module, which includes multiple batteries as described above.

In a fourth aspect, the present disclosure provides a battery pack, which includes multiple batteries or multiple battery modules as described above.

In a fifth aspect, the present disclosure provides a vehicle, which includes a battery or a battery pack as described above.

Compared with related art, the present disclosure has the following beneficial effects.

According to the battery core assembly provided in the present disclosure, after injection into the accommodating cavity, the electrolyte solution is filled in a space between an inner surface of the encapsulation film and an outer surface of the electrode core assembly. At least one first spacer is provided with at least one first liquid reservoir to expand the liquid storage space in each accommodating cavity, and the at least one first liquid reservoir communicates with the accommodating cavity. As such, when the electrolyte solution is injected into the accommodating cavity, the electrolyte solution can enter the first liquid reservoir, to store the additional electrolyte solution by using the first liquid reservoir.

Figure 1:
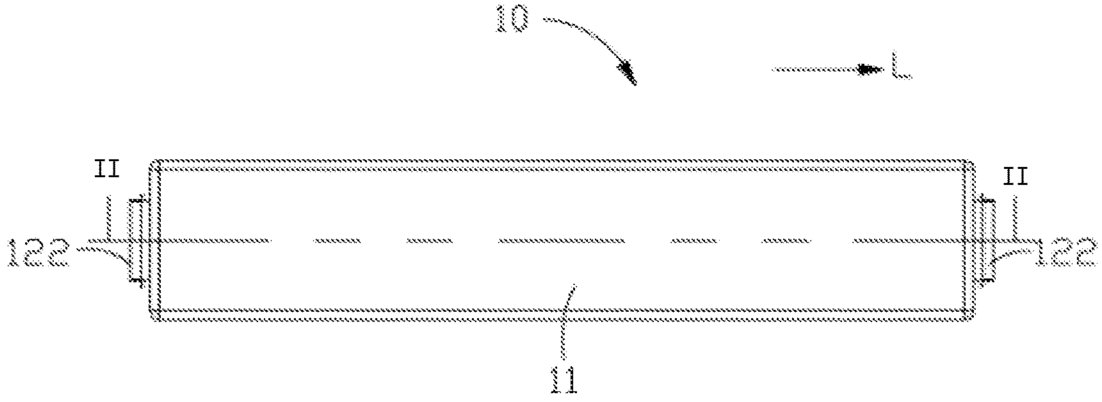
FIG. 1 is a schematic structural view of a battery core assembly provided in a first embodiment of the present disclosure.

REFERENCE NUMERALS OF THE ACCOMPANYING DRAWING battery pack 200; battery 100; battery core assembly 10; encapsulation film 11; accommodating cavity 110; electrode core assembly 12; electrode core 121; electrode core body 1211; tab 1213; electrode lead-out member 122; contact portion 1221; lead-out portion 1223; electrode core assembly body 123; tab support 124; hollow cavity 1240; first surface 1241; third surface 1243; fourth surface 1244; opening 1245; engaging hole 1246; two side walls 1247; bottom wall 1248; insulating spacer 125; buckle 1251; first spacer 13; electrode connection hole 131; first liquid reservoir 132; connecting surface 133; first outer surface 134; second outer surface 135; second spacer 14; electrode lead-out hole 141; third liquid reservoir 142; casing 20; tray 22;

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, to explain the present disclosure and cannot be construed as a limitation on the present disclosure.

In the description of the present disclosure, it should be understood that, terms such as “length”, “width”, “up”, “down”, “front”, “rear”, “left”, “right”, “vertical”, “horizontal”, “top”, “bottom”, “inside”, and “outside” indicate an orientation or position relationship based on the orientation or position shown in the accompanying drawings. These terms are merely for the convenience of describing the present disclosure and simplifying the description, and not to indicate or imply that the device or element referred to needs to have a particular orientation, be constructed and operated in a particular orientation, and therefore cannot be understood as a limitation on the present disclosure.

In addition, the terms “first” and “second” are used merely for the purpose of description, and shall not be construed as indicating or implying relative importance or implying a number of indicated technical features. Therefore, features defining “first” and “second” may explicitly or implicitly include one or more such features. In the description of the present disclosure, “number of”, “multiple”, or “plurality of” means two or more, unless otherwise specifically defined.

In the present disclosure, terms such as “installation”, “connected”, “connection”, and “fastening” shall be understood in a broad sense unless otherwise expressly specified and defined, which for example, may be fixedly connected, detachably connected, or integrally formed; may be mechanically or electrically connected; may be directly connected or indirectly connected by an intermediate medium; or may be connection between two elements or interaction between two elements. For a person of ordinary skill in the art, specific meanings of the terms in the present disclosure may be understood based on a specific situation.

The present disclosure provides a battery core assembly 10, applied to a battery 100, and encapsulated or disposed in a casing 20 of the battery 100 as a battery core of the battery 100. The battery core assembly includes an encapsulation film 11 and multiple electrode core assemblies 12 encapsulated in the encapsulation film 11. The electrode core assemblies 12 are connected in series to form an electrode core string, and each electrode core assembly 12 includes at least one electrode core 121. A first spacer 13 is provided between at least two adjacent electrode core assemblies 12, where the first spacer 13 is joined to the encapsulation film 11 to divide an accommodating space inside the encapsulation film 11 into multiple accommodating cavities 110. A cavity wall of the accommodating cavity 110 includes the first spacer 13 and the encapsulation film 11 connected to the first spacer 13. One electrode core assembly 12 is accommodated in each accommodating cavity 110. At least one first spacer 13 is provided with at least one first liquid reservoir 132, and each first liquid reservoir 132 communicates with one of the accommodating cavities 110 on both sides of the first spacer 13.

Compared with related art, the present disclosure has the following beneficial effects.

In the present disclosure, after injection into the accommodating cavity 110, the electrolyte solution is filled in a space between an inner surface of the encapsulation film 11 and an outer surface of the electrode core assembly 12. At least one first spacer 13 is provided with at least one first liquid reservoir 132 to expand the liquid storage space in each accommodating cavity 110, and the at least one first liquid reservoir 132 communicates with the accommodating cavity 110. As such, when the electrolyte solution is injected into the accommodating cavity 110, the electrolyte solution can enter the first liquid reservoir 132, to store the additional electrolyte solution by using the first liquid reservoir 132.

Figure 2:
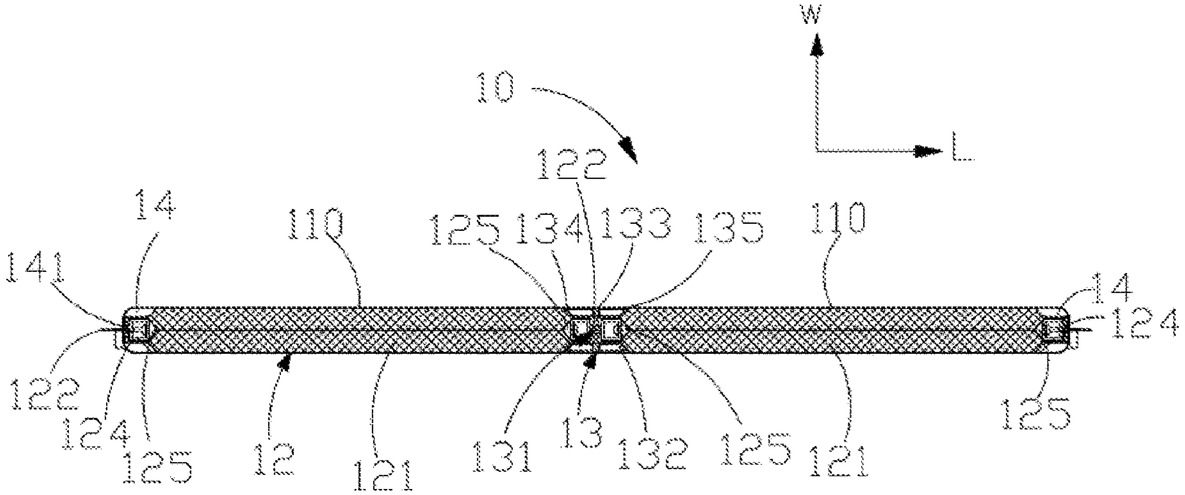
FIG. 2 is a schematic cross-sectional view of the battery core assembly shown in FIG. 1 along II-II.

FIG. 1 is a schematic structural view of a battery core assembly 10 provided in a first embodiment of the present disclosure, and FIG. 2 is a schematic cross-sectional view along II-II of the battery core assembly 10 provided in first embodiment of the present disclosure, from which an encapsulation film 11 is removed. Referring to FIG. 1 and FIG. 2, the battery core assembly 10 includes an encapsulation film 11 and multiple electrode core assemblies 12 encapsulated in the encapsulation film 11. The multiple electrode core assemblies 12 are connected in series to form an electrode core string. It can be understood that in this embodiment, the multiple electrode core assemblies 12 include two electrode core assemblies 12. Each electrode core assembly 12 includes at least one electrode core 121. A first spacer 13 is provided between at least two adjacent electrode core assemblies 12. The first spacer 13 is joined to the encapsulation film 11 to divide an accommodating space inside the encapsulation film 11 into multiple accommodating cavities 110. A cavity wall of the accommodating cavity 110 includes the first spacer 13 and the encapsulation film 11 connected to the first spacer 13. The electrode core assembly 12 is accommodated in each accommodating cavity 110. At least one first spacer 13 is provided with at least one first liquid reservoir 132, and each first liquid reservoir 132 communicates with one of the two accommodating cavities 110 on two sides of the first spacer 13.

In the present disclosure, an electrolyte solution is injected in the accommodating cavity 110. It can be understood that after injection into the accommodating cavity 110, the electrolyte solution is filled in a space between an inner surface of the encapsulation film 11 and an outer surface of the electrode core assembly 12. At least one first spacer 13 is provided with at least one first liquid reservoir 132 to expand the liquid storage space in each accommodating cavity 110, and the at least one first liquid reservoir 132 communicates with the accommodating cavity 110. As such, when the electrolyte solution is injected into the accommodating cavity 110, the electrolyte solution can enter the first liquid reservoir 132, to store the additional electrolyte solution by using the first liquid reservoir 132.

The content of the electrolyte solution in the battery is an important factor affecting the service life of the battery. However, during the use of the battery, the electrolyte solution may gradually decrease due to expansion and other factors, affecting the service life of the battery. Moreover, lithium plating may also occur in some areas of the batteries, thereby reducing the safety of the battery.

In the embodiment of present disclosure, the first spacer 13 is provided with the first liquid reservoir 132. When an electrolyte solution is injected into the encapsulation film 11, the first liquid reservoir 132 can store a certain amount of the electrolyte solution. As such, when the encapsulation film 11 is vacuumed to form the battery core, the possibility of withdrawing free electrolyte solution during the vacuuming process is reduced, and the amount of the electrolyte solution stored is maximized. Further, during the long-term use of the battery, the electrolyte solution in the battery core assembly 10 can be replenished in time, to reduce the occurrence of lithium plating in the battery, and to improve the cycle life of the battery.

In some embodiments of the present disclosure, the first liquid reservoir 132 is recessed from an outer surface of the first spacer 13 to the interior of the first spacer 13.

In some embodiments, the length of the electrode core assembly 10 extends along a first direction L, and the thickness of the electrode core assembly 10 extends along a second direction W, where the first direction L is perpendicular to the second direction W. The outer surface of the first spacer 13 refer to the two surfaces of the first spacer 13 that are oppositely arranged in the second direction W.

Therefore, the electrolyte solution stored in the first liquid reservoir 132 is unlikely to be withdrawn during the vacuuming process, so that more electrolyte solution can be stored in the accommodating cavity 110.

In some embodiments of the present disclosure, except for the portions for joining, other portions of the first spacer 13 and the encapsulation film 11 are not joined, to allow the first liquid reservoir 132 to communicate with the accommodating cavity 110. Therefore, when an electrolyte solution is injected into the accommodating cavity 110 defined by the encapsulation film 11, the electrolyte solution can enter the first liquid reservoir 132, so that the first liquid reservoir 132 can store a certain amount of the electrolyte solution.

In some embodiments of the present disclosure, multiple reinforcing ribs are provided in the first liquid reservoir 132, to divide the first liquid reservoir 132 into multiple liquid storage units. In this embodiment, three reinforcing ribs are provided, and the three reinforcing ribs divide the first liquid reservoir 132 into four liquid storage units. In other embodiments, the number of the reinforcing rib is not limited to 3, and may also be 1, 2, 4, or 5. The number of the liquid storage unit may be, but is not limited to, 4, and may also be less than 4 or more than 4.

Therefore, by arranging the reinforcing ribs in the first liquid reservoir 132, the overall strength of the first spacer 13 can be enhanced, so that the first spacer 13 may have a higher overall compressive strength.

In some embodiments of the present disclosure, the outer surface of the first spacer 13 includes a connecting surface 133 and a first outer surface 134 and a second outer surface 135 located on two sides of the connecting surface 133. The connecting surface 133 is joined to the encapsulation film 11, and the first outer surface 134 and the second outer surface 135 are respectively located in the two accommodating cavities 110 on two sides of the first spacer 13.

A portion of the first outer surface 134 is recessed toward the interior of the first spacer 13 to form the first liquid reservoir 132, or a portion of the second outer surface 135 is recessed toward the interior of the first spacer 13 to form the first liquid reservoir 132, or a portion of the first outer surface 134 and a portion of the second outer surface 135 are both recessed toward the interior of the first spacer 13 to form the first liquid reservoir 132.

In this embodiment, a portion of the first outer surface 134 and a portion of the second outer surface 135 are both recessed toward the interior of the first spacer 13 to form the first liquid reservoir 132.

In other embodiments, a portion of the first outer surface 134 or the second outer surface 135 is recessed toward the interior of the first spacer 13 to form the first liquid reservoir 132.

Therefore, the first liquid reservoir 132 expands the liquid storage space in each accommodating cavity 110, and stores more electrolyte solution to reduce the possibility of withdrawing free electrolyte solution during an vacuuming process, and to maximize the amount of the electrolyte solution stored. During the long-term use of the battery core assembly 10, the electrolyte solution in the battery core assembly 10 can be replenished in time, to reduce the occurrence of lithium plating in the battery, and to improve the cycle life of the battery.

In some embodiments of the present disclosure, the multiple electrode core assemblies 12 are sequentially arranged along the first direction L, and each electrode core assembly 12 is provided with two electrode lead-out members 122 of opposite polarities for current output, where one of the two electrode lead-out members 122 is a positive electrode lead-out member, and the other is a negative electrode lead-out member. The two electrode lead-out members 122 are arranged at two ends of the electrode core assembly 12 in the first direction L.

An electrode connection hole 131 is provided on the first spacer 13, two electrode lead-out members 122 of two adjacent electrode core assemblies 12 have opposite polarities and are connected at a position in the electrode connection hole 131 on the first spacer 13 between the two adjacent electrode core assemblies 12.

In some embodiments of the present disclosure, the first spacer 13 has an integral structure. For example, the first spacer 13 may be formed by injecting a plastic material between the two adjacent electrode core assemblies 12. The position of the connection of the two adjacent electrode core assemblies 12 is enclosed by the injected material, and the electrode connection hole 131 is a through hole penetrating a central portion of the first spacer 13.

In some other embodiments of the present disclosure, the first spacer 13 includes a first spacer portion having a first groove and a second spacer portion having a second groove, where the first spacer portion and the second spacer portion are fixed to each other, and the first groove and the second groove right face each other to form the electrode connection hole 131. Namely, the first spacer 13 may include two spacer portions arranged opposite to each other, so that groove openings on the two spacer portions are arranged facing each other to form the electrode connection hole 131. When assembled, two adjacent electrode core assemblies 12 are connected in series, and then a blocking member is provided on the grooves of the spacer portions in such a manner that a space for accommodating the connection position of two adjacent electrode core assemblies 12 is reserved in the grooves. The two spacer portions are arranged on two sides of the connection position to jointly clamp the connection position. For the purpose of better sealing the electrode connection hole 131, the two spacer portions can be bonded to the connection position, so that the gap between the spacer portion and the connection position is sealed by an adhesive.

It can be understood that the electrode connection hole 131 not only accommodates the connection position of two serially connected electrode lead-out members 122 of two adjacent electrode core assemblies 12 therein, and the electrode connection hole 131 is provided with a blocking member to seal the electrode connection hole 131. Therefore, the electrolyte solution cannot flow in the two adjacent accommodating cavities 110 through the electrode connection hole 131.

In some embodiments of the present disclosure, the length of the electrode core 121 extends along a first direction L, and the thickness of the electrode core 121 extends along a second direction W perpendicular to the first direction L. When the electrode core assembly 12 includes multiple electrode cores 121, the multiple electrode cores 121 are arranged in sequence along the second direction W. Multiple first liquid reservoirs 132 are arranged along the second direction W.

FIG. 2 schematically shows two first liquid reservoirs 132, and the two first liquid reservoirs 132 are arranged along the second direction W on two opposite sides of the electrode connection hole 131.

Therefore, multiple first liquid reservoirs 132 are provided on the first spacer 13, so that the space on the first spacer 13 is fully utilized. More first liquid reservoirs 132 are provided while the strength of the spacer 13 is ensured, so that more electrolyte solution can be stored, to reduce the occurrence of lithium plating in the battery, and to improve the cycle life of the battery.

Figure 3:
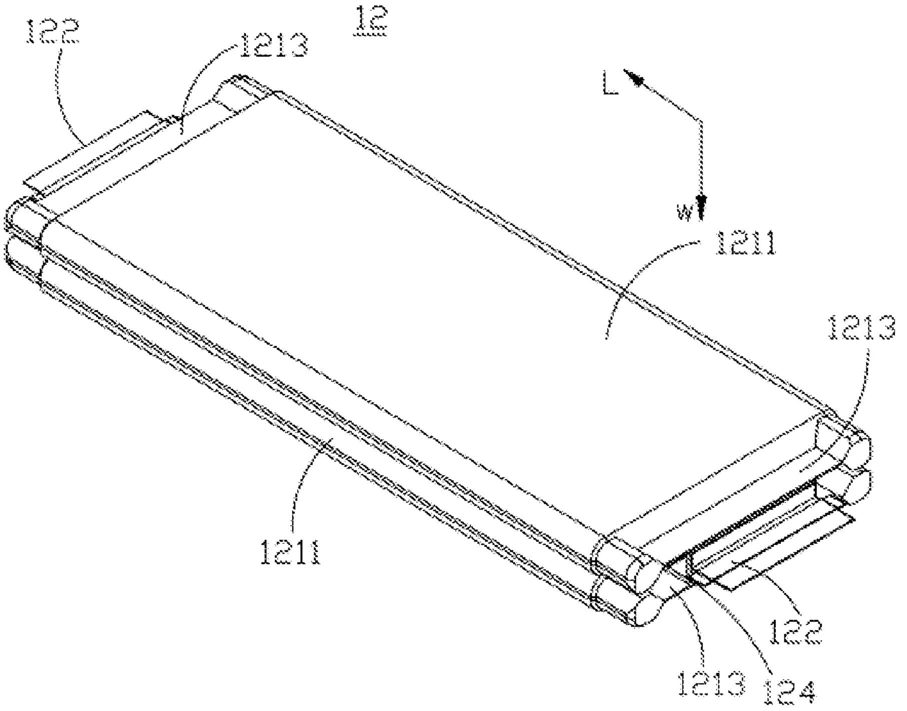
FIG. 3 is a schematic structural view of an electrode core assembly shown in FIG. 1.

In some embodiments of the present disclosure, the electrode core assembly 12 includes at least two electrode cores 121, and the at least two electrode cores 121 are arranged along the second direction W, where the electrode cores 121 are connected in series or in parallel. As shown in FIGS. 2-3, two electrode cores 121 connected in parallel, where the two electrode cores 121 are arranged along the thickness direction of the electrode core 121, that is, the second direction W.

In some embodiments of the present disclosure, referring to FIGS. 3, two adjacent electrode cores 121 are connected in parallel. Each of the electrode cores 121 includes an electrode core body 1211 and two tabs 1213 of opposite polarities that are electrically connected to the electrode core body 1211. The two tabs 1213 are respectively arranged at two opposite ends of the electrode core body 1211 in the first direction L. In addition, the tabs 1213 with the same polarity of two adjacent electrode cores 121 are located at the same end in the first direction L, and the two adjacent tabs 1213 with the same polarity are electrically connected, to connect the two adjacent electrode cores 121 in parallel.

In the present disclosure, the electrode core 121 can be regarded as an electrode core commonly used in the field of power batteries, and the electrode core 121 and the electrode core assembly 12 are components inside the casing of a battery and shall not be understood as the battery itself. The electrode core 121 can be a winding electrode core 121, or the electrode core 121 generally refers to an assembly that is not fully sealed. Therefore, the battery mentioned in the present disclosure shall not be simply regarded as a battery module or battery assembly merely because it includes multiple electrode cores 121. In the present disclosure, the electrode core assembly 12 may include a single electrode core 121 or multiple electrode cores 121, where the multiple electrode cores 121 are connected in parallel to form the electrode core assembly 12. For example, two electrode cores 121 are connected in parallel to form the electrode core assembly 12, or four electrode cores 121 are connected in parallel to form the electrode core assembly 12, or eight electrode cores 121 are connected in parallel to form the electrode core assembly 12.

Figure 4:
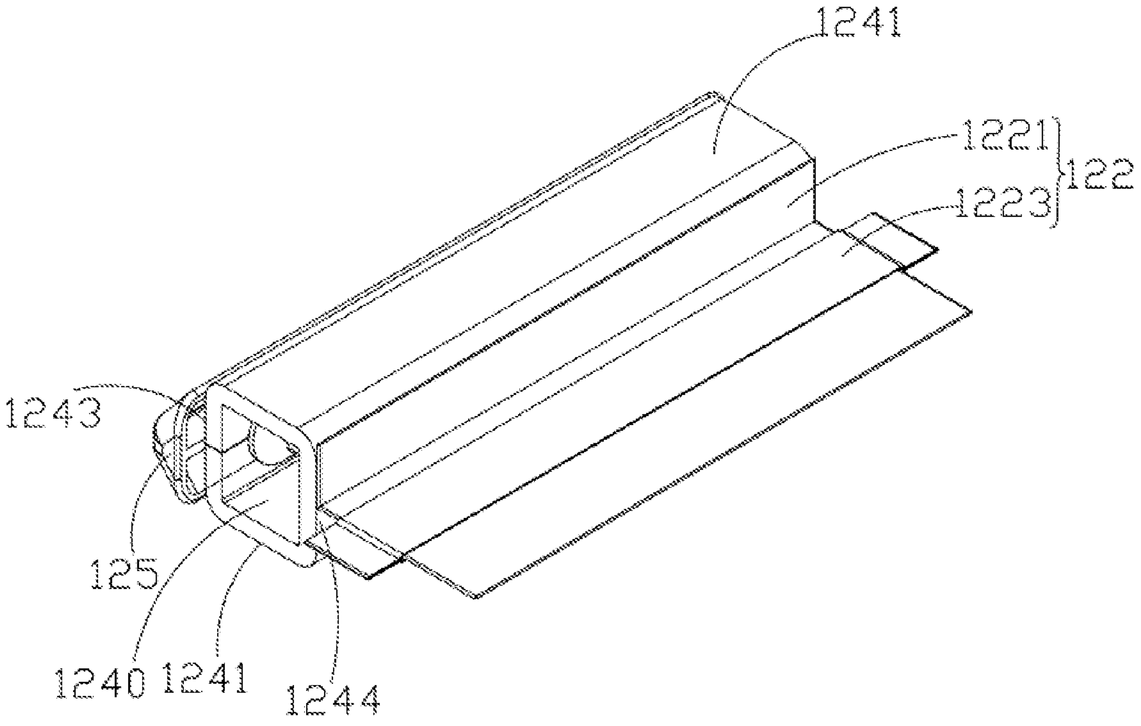
FIG. 4 schematically shows the assembly of an insulating spacer, a tab support, and an electrode lead-out member shown in FIG. 3.
Figure 5:
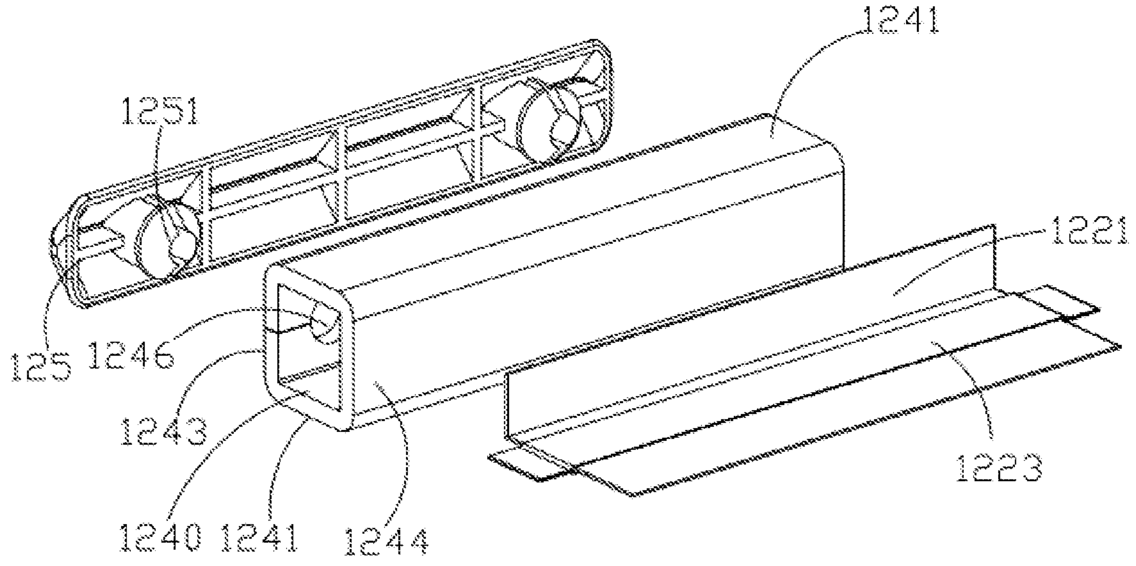
FIG. 5 shows a disassembled structure of FIG. 4.

In some embodiments of the present disclosure, referring to FIGS. 4 and 5, the electrode core assembly 12 further includes a tab support 124 positioned between two adjacent tabs 1213 with the same polarity. The two adjacent tabs with the same polarity 1213 are electrically connected to the tab support 124, that is, the two adjacent tabs 1213 at the same end are electrically connected by the tab support 124. As shown in FIG. 3, a tab support 124 is provided at each end of the electrode core assembly 12 in the length direction.

Each of the electrode lead-out members 122 of the electrode core assembly 12 is electrically connected to one of the tab supports 124 located at one end of the electrode core assembly body 123 in the first direction L. It can be understood that when the electrode core assembly 12 includes three, four or even more electrode cores 121, multiple tab supports 124 will be provided at each end of the electrode core assembly 12 in the length direction. In the embodiment of present disclosure, the positive electrode lead-out member 122 of the electrode core assembly 12 is located at the same end (e.g., a first end) of the electrode core assembly 12 with the positive electrode tab 1213, and electrically connected to the positive electrode tab 1213; and the negative electrode lead-out member 122 is located at the other end (e.g., a second end) of the electrode core assembly 12 with the negative electrode tab 1213, and electrically connected to the negative electrode tab 1213. According to some embodiments of the present disclosure, the electrode lead-out member 122 is electrically connected by one tab support 124 located the same end, so as to be electrically connected to a corresponding tab 1213.

For example, in the embodiment shown in FIG. 3 to FIG. 5, the electrode core assembly 12 includes two electrode cores 121. In this case, one tab support 124 is provided at each of two opposite ends of the electrode core assembly 12 in the length direction L. The tab support 124 at each end is located between two tabs 1213 at the same end, and electrically connected to the two tabs 1213 at the same end.

It can be understood that in some embodiments of the present disclosure, when two or more tab supports 124 are provided at the same end of the electrode cores 121, since two adjacent tab supports 124 at the same end are spaced apart by the tab 1213, for the purpose of electrically connecting the two adjacent tab supports 124, the tab support 124 needs to be provided with a convex edge extending along the first direction L beyond the edge of the tab 1213 to electrically connect the adjacent two tab supports 124 through the contact of the convex edges.

In some embodiments of the present disclosure, referring to FIGS. 3 to 5, the tab support 124 is connected to the electrode lead-out member 122 and the tab 1213 at positions that are respectively located on different surfaces of the tab support 124. Namely, the electrode lead-out member 122 and the tab 1213 that are electrically connected to the same tab support 124 are connected to the tab support 124 at positions respectively located on different surfaces of the tab support 124. Therefore, a situation that the electrode lead-out member 122 and the tab 1213 are both superimposed on the same surface of the tab support 124 is avoided, to reduce the thickness at positions where the tab support 124 is connected to the electrode lead-out member 122 or the tab 1213.

In some embodiments of the present disclosure, the electrode lead-out member 122 includes a contact portion 1221 and a lead-out portion 1223. The contact portion 1221 is directly electrically connected to the tab support 124. The lead-out portion 1223 is drawn from the contact portion 1221 and extends along the first direction L. A part of the contact portion 1221 attached to the tab support 124 is plate-like, to increase the contact area between the contact portion 1221 and the tab support 124. Therefore, the welded area between the tab support 124 and the contact portion 1221 is increased, to improve the connection reliability. In this embodiment, the lead-out portion 1223 is connected to one side of the contact portion 1221 in the first direction L to form an L-shaped bracket. In other embodiments, the lead-out portion 1223 is connected to a middle portion of the contact portion 1221 in the first direction L to form an L-shaped bracket. The contact portion 1221 of the electrode lead-out member 122 and the tab support 124 can be electrically connected by welding.

In some embodiments of the present disclosure, the tab support 124 includes two opposite first surfaces 1241, where the two first surfaces 1241 face two adjacent tabs 1213 with the same polarity respectively, and the two adjacent tabs 1213 with the same polarity are respectively directly attached to the two first surfaces 1241 of the tab support 124. The tab 1213 and the tab support 124 can be electrically connected by welding. By fixedly attaching the tab 1213 to the first surface 1241 of the tab support 124, the tab 1213 can be prevented from moving or shifting.

In some embodiments of the present disclosure, at least one tab support 124 connected to the electrode lead-out member 122 is a square piece, that is, the cross-section of the tab support 124 is of a square shape, and the tab support 124 has a cube structure over all. It can be understood that all the tab support 124 can be arranged as a square piece in the present disclosure. The arrangement of the tab support 124 as a square piece can provide a better support ability for the tabs 1213, which can prevent the deformation of the tab support 124 during the welding process especially when the tab 1213 is welded to the tab support 124, and can increase the compression resistance of the tab support 124.

In some embodiments of the present disclosure, the square piece includes the two first surfaces 1241, a third surface 1243 located between the two first surfaces 1241 and facing the electrode core body 1211, and a fourth surface 1244 opposite to the third surface 1243.

The tab support 124 electrically connected to the electrode lead-out member 122 is connected to the electrode lead-out member 122 through the fourth surface 1244. Specifically, the contact portion 1221 of the electrode lead-out member 122 is connected to the fourth surface 1244 of the tab support 124. Two adjacent tabs 1213 are respectively connected to the two first surfaces 1241. That is, the electrode lead-out member 122 and the tab 1213 are both in direct contact with and connected to the tab support 124 at positions located on different surfaces of the tab support 124. Therefore, a situation that the electrode lead-out member 122 and the tab 1213 are both superimposed on the same surface of the tab support 124 can be avoided, to reduce the thickness at positions where the tab support 124 is connected to the electrode lead-out member 122 and the tab 1213, and to facilitate the connection between the electrode lead-out member 122 and the tab support 124.

In some embodiments of the present disclosure, the interior of at least one tab support 124 is a hollow cavity 1240. For example, the interior of all the tab supports 124 can be arranged to have a hollow cavity 1240. The arrangement of the hollow tab support 124 can reduce the weight while ensuring the support strength.

In some embodiments of the present disclosure, the hollow cavity 1240 is provided with an opening in at least one cavity wall. As shown in FIGS. 4 and 5, the hollow cavity 1240 can be provided with an opening on either of two end faces, where the opening communicates with the electrode connection hole 131 on the first spacer 13 located on the same side with the tab support 124, such that the hollow cavity 1240 is formed into a second liquid reservoir. By bringing the tab support 124 into communication with the electrode connection hole 131 on the first spacer 13 on the same side, an electrolyte solution can enter the hollow cavity 1240 communicating therewith via the electrode connection hole 131, when the electrolyte solution is injected into the encapsulation film 11. Accordingly, the hollow cavity 1240 can be used to store the electrolyte solution, to attain a liquid storage function.

Figure 6:
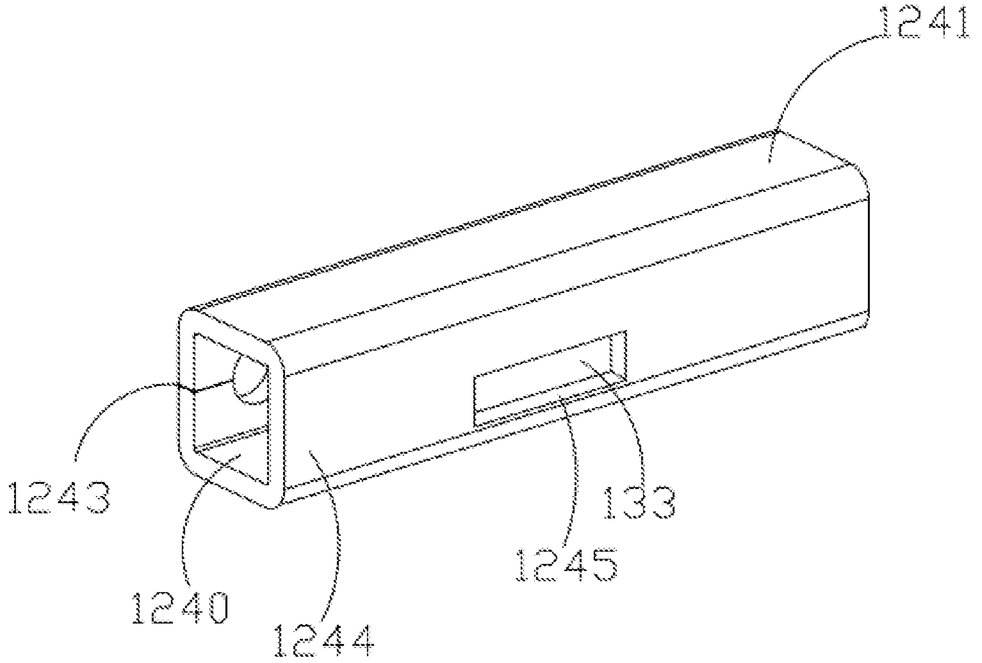
FIG. 6 is a schematic structural view of a tab support provided in some other embodiments of the present disclosure.

In some other embodiments, referring to FIGS. 6, an opening 1245 may be provided in a cavity wall of the tab support 124 where the fourth surface 1244 is positioned, and the opening 1245 communicates with the electrode connection hole 131 on the first spacer 13 on the same side, such that the hollow cavity 1240 is formed into a second liquid reservoir. The arrangement of an opening 1234 communicating with the electrode connection hole 131 on a cavity wall where the fourth surface 1244 is positioned can further facilitate the flow of the electrolyte solution in and out of the hollow cavity 1240. Therefore, the liquid storage space is further increased by the second liquid reservoir.

In some embodiments of the present disclosure, referring to FIGS. 3, 4 and 5, an insulating spacer 125 is provided between the tab support 124 and the electrode core body 1211. The insulating spacer 125 electrically isolates the electrode core 121 and the tab support 124.

In some embodiments of the present disclosure, referring to FIG. 3 again, the two opposite ends of the electrode core body 1211 in the first direction L are V-shaped ends with a tip protruding outward, the two tabs 1213 of each of the electrode cores 121 are respectively located at the tips of the two V-shaped ends, and a V-shaped space is formed between the V-shaped ends of the two adjacent electrode core bodies 1211 at the same end in the first direction L. The insulating spacer 125 is a V-shaped piece matching the shape of the V-shaped space. The V-shaped piece is fitted or coupled in the V-shaped area. That is, the outer surfaces of the V-shaped sides of the insulating spacer 125 are respectively attached to the two V-shaped ends forming the V-shaped space, to isolate the electrode core body 1211 and the tab support 124, and to support the V-shaped ends of the electrode core body 1211, thereby protecting the electrode core 12 against deformation due to collision.

In some embodiments of the present disclosure, the angle of the V-shaped space is 90-150 degrees. According to some embodiments of the present disclosure, for example, the angle may be in the range of 100-120 degrees, or 120-145 degrees, and may be 95 degrees, 110 degrees or 125 degrees in some embodiments, which is not limited herein.

In some other embodiments, the two opposite ends of the electrode core body 1211 in the first direction L can also be straight, square, or arc-shaped. Correspondingly, the shape of the insulating spacer 125 also needs to be adjusted for adaptation, which is not limited herein.

In some embodiments of the present disclosure, the insulating spacer 125 is fixed to the tab support 124 by a snap mechanism. In some embodiments, referring to FIGS. 5, a buckle 1251 is provided on the insulating member 125, and an engaging hole 1246 is provided on the third surface 1243 of the tab support 124. The buckle 1251 is snapped into the engaging hole 1246 by extrusion deformation to form a snap connection. Two buckles 1251 are provided, and two engaging holes 1246 are provided, where the two buckles 1251 are snapped into the two engaging holes 1246 to form the snap connection. Therefore, a firm connection is formed between the insulating member 125 and the tab support 124. In this way, the insulating member 125 electrically isolate the tab support 124 and the electrode core body 1211.

It should be noted that the insulating spacer 125 and the tab support 124 may only be in contact with each other without being fixed by a fastener, or they can be fixed in a manner of being pressed against each other through a reasonable spatial arrangement. Furthermore, the insulating spacer 125 and the tab support 124 can also be glued together, or fixed together in other ways, which is not limited herein.

Figure 7:
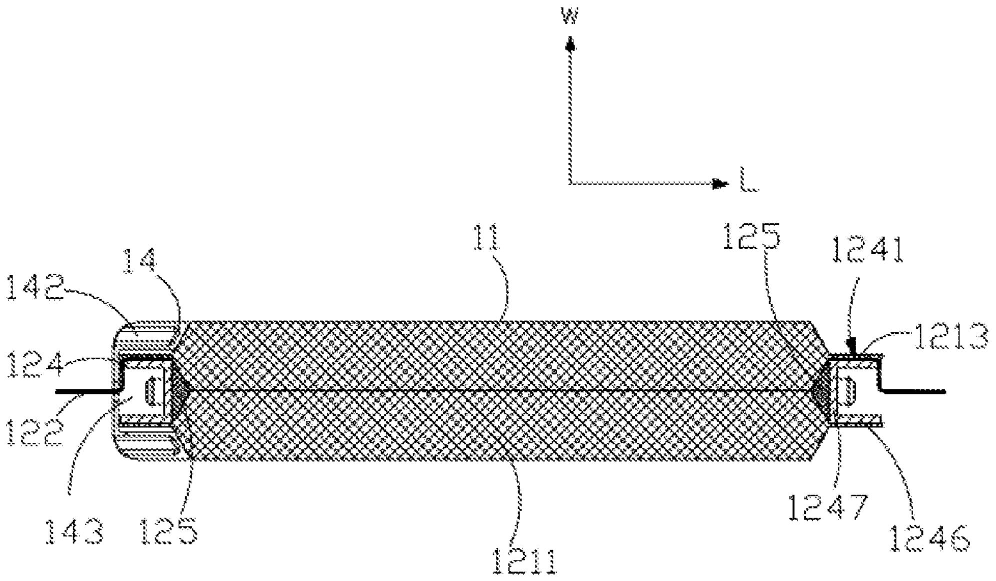
FIG. 7 is a schematic cross-sectional view of a battery core assembly provided in a second embodiment of the present disclosure.

FIG. 7 is a schematic cross-sectional view of a battery core assembly provided in a second embodiment. Referring to FIG. 7, the second embodiment differs from the first embodiment in that the tab support 124 is a U-shaped piece, and the opening of the U-shaped piece is oriented parallel to the first direction L. The U-shaped piece includes two opposite side walls 1247 and a bottom wall 1248 between the two opposite side walls 1247, and the outer surfaces of the two opposite side walls 1247 are the two first surfaces 1241 respectively. Namely, adjacent two tabs 1213 are respectively attached to the outer surfaces of the two opposite side walls 1247.

As shown in FIG. 7, the opening of the U-shaped piece faces the spacer 13 at the same end. That is, the opening of the U-shaped piece is arranged to face away from the electrode core body 1211, and the tab support 124 is connected to the electrode lead-out member 122 through one of the side walls 1247. In some embodiments, the portion of the electrode lead-out member 122 for electrical connection with the tab support 124 is located between one of the tabs 1213 and a corresponding side wall 1247. That is, the electrode lead-out member 122 and one tab 1213 are stacked on and welded to the outer surface of one of the side walls 1247.

The opening of the U-shaped piece communicates with the electrode connection hole 131 on the first spacer 13 at the same end, such that an inner cavity in the U-shaped piece is formed into a second liquid reservoir. Therefore, an auxiliary space for storing the electrolyte solution is further increased.

In some embodiments of the present disclosure, the opening of the U-shaped piece faces the electrode core body 1211, and the tab support 124 is connected to the electrode lead-out member 122 through the bottom wall 1248. In this case, the opening of the U-shaped piece communicates with the electrode connection hole 131 on the first spacer 13 at the same end, such that an inner cavity in the U-shaped piece is also formed into a second liquid reservoir.

In some embodiments of the present disclosure, referring to FIGS. 1, 2 and 7, a second spacer 14 is further arranged at two ends of the electrode core string, and the second spacer 14 is provided with an electrode lead-out hole 141 penetrating through the second spacer 14. One of the electrode lead-out member 122 of the electrode core assembly 12 at one end of the electrode core string is led out from the electrode lead-out hole 141 on the second spacer 14 at the same end, and one of the electrode lead-out members 122 of the electrode core assembly 12 at the other end of the electrode core string is led out from the electrode lead-out hole 141 on the second spacer 14 at the same end. The second spacer 14 is provided with a second liquid reservoir, the second liquid reservoir is recessed from an outer surface of the second spacer 14 to the interior of the second spacer 14, the second liquid reservoir on the second spacer 14 communicates with the accommodating cavity 110 in which the electrode core assembly 12 is located, and the second liquid reservoir on the second spacer 14 and the electrode core assembly 12 are located at the same end of the electrode core string.

In some embodiments of the present disclosure, multiple reinforcing ribs are provided in the second liquid reservoir 142, to divide the second liquid reservoir 142 into multiple liquid storage units. In an embodiment, three reinforcing ribs are provided, and the three reinforcing ribs divide the second liquid reservoir 142 into four liquid storage units. In other embodiments, the number of the reinforcing rib is not limited to 3, and may be 1, 2, 4, or 5. The number of the liquid storage unit may be, but is not limited to, 4, and may also be less than 4 or more than 4.

Therefore, by arranging the reinforcing rib in the second liquid reservoir 142, the overall strength of the second spacer 14 can be enhanced, to enable the second spacer 14 to have a higher overall compressive strength.

Figure 8:
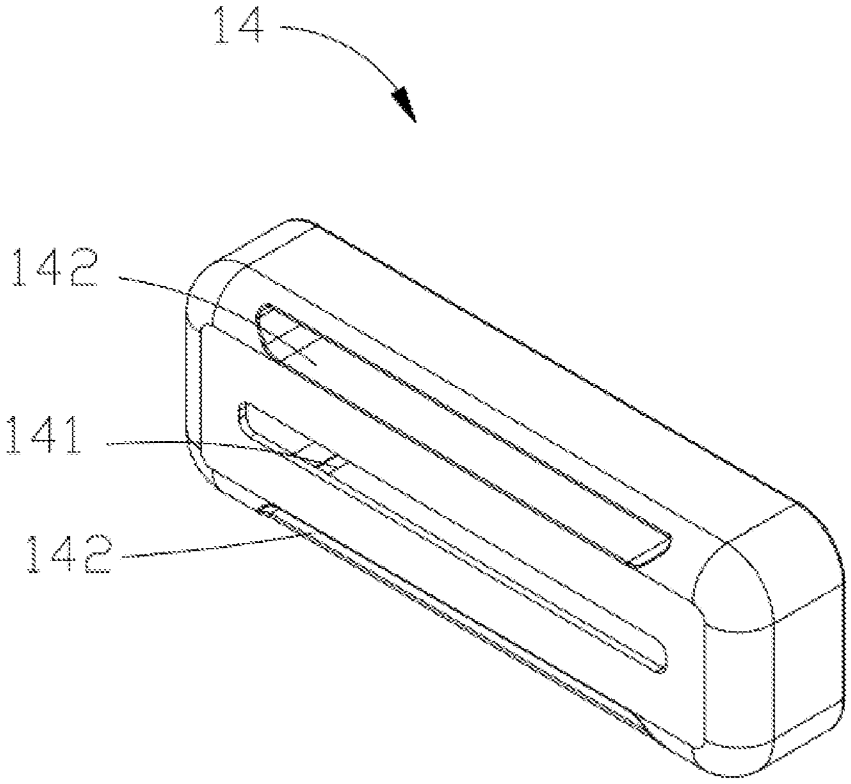
FIG. 8 is a schematic structural perspective view of a second spacer shown in FIG. 7.
Figure 9:
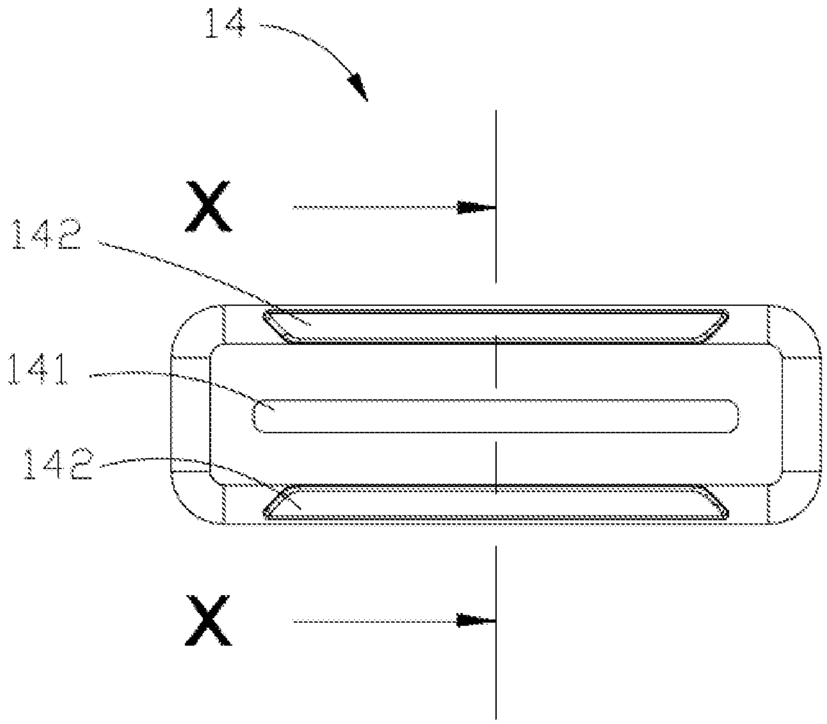
FIG. 9 is a left side view of the second spacer shown in FIG. 8.
Figure 10:
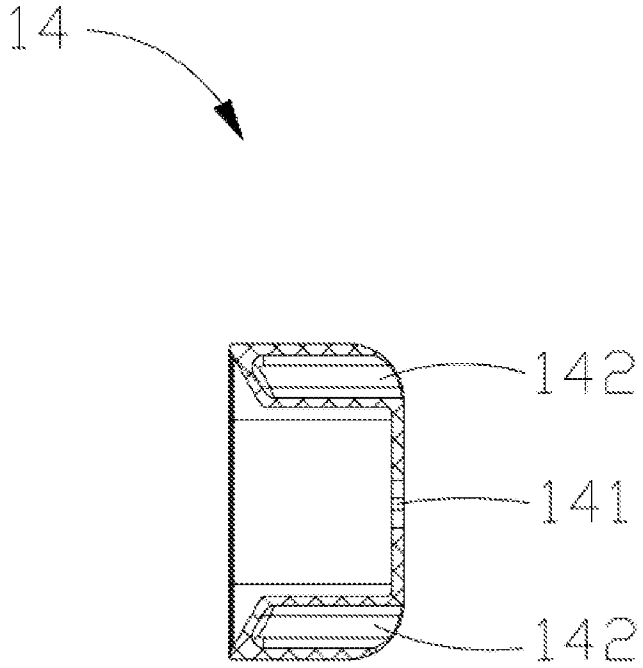
FIG. 10 is a schematic cross-sectional view of FIG. 9 along X-X.

The second embodiment differs from the first embodiment in that no reinforcing ribs are arranged in the second liquid reservoir 142 as shown in FIGS. 8, 9 and 10. Namely, the second liquid reservoir 142 includes only one liquid storage unit. Two second liquid reservoirs 142 are arranged along the second direction W symmetrically on two opposite sides of the electrode lead-out hole 141.

In some embodiments of the present disclosure, the number of the second liquid reservoir 142 may be three or more, which is not limited herein.

Therefore, the space on the second spacer 14 is fully utilized, such that the second spacer 14 can store more electrolyte solution, to reduce the occurrence of lithium plating in the battery, to improve the cycle life of the battery, and to simplify the structure.

In some other embodiments of the present disclosure, the first spacer 13 and the second spacer 14 have the same structure. Namely, two second spacers 14 are provided in each accommodating cavity 110, where the two second spacers 14 are respectively arranged at two opposite ends of the electrode core assembly body 123 in the first direction L, and respectively mounted around the two opposite ends of the electrode core assembly body 123 in first direction L, and the two opposite ends of the electrode core assembly body 123 in the first direction L are respectively fitted in the accommodating space of a corresponding second spacer 14. Moreover, the encapsulation film 11 is sealed at a position between two adjacent second spacers 14.

Figure 11:
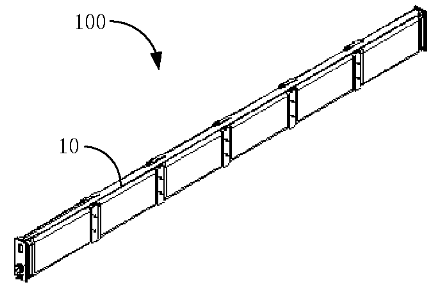
FIG. 11 is a schematic structural view of a battery without a casing provided in an embodiment of the present disclosure.
Figure 12:
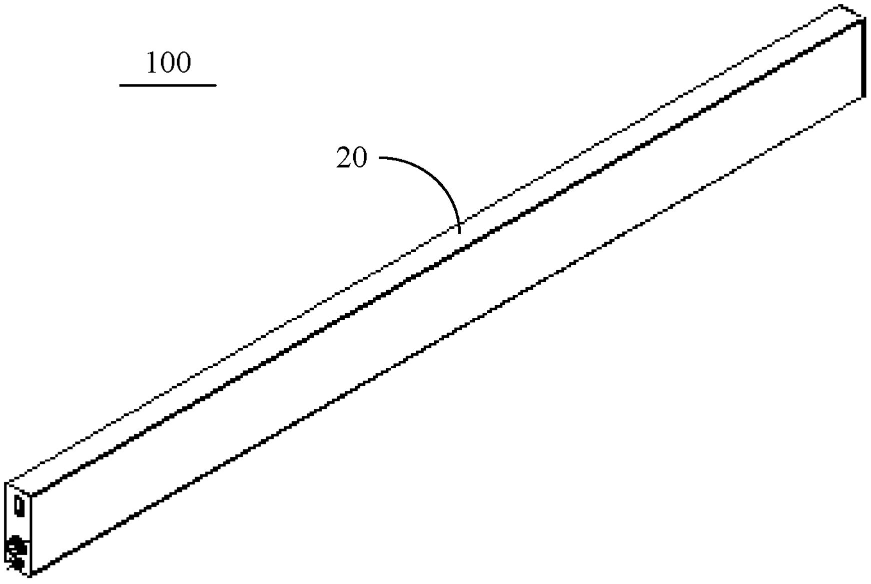
FIG. 12 is a schematic structural view of a battery with a casing provided in an embodiment of the present disclosure.

Referring to FIGS. 11 and 12, in a battery embodiment provided in the present disclosure the battery 100 includes a casing 20 and at least one battery core assembly 10 packaged or disposed in the casing 20. As shown in FIG. 11, multiple battery core assemblies 10 are encapsulated in the casing 20, and the multiple battery core assemblies 10 are arranged in sequence along the length direction of a length direction of the battery 100. When the multiple battery core assemblies 10 are connected in series, the positive electrode lead-out member 122 of one battery core assembly 10 of two battery core assemblies 10 is electrically connected to the negative electrode lead-out member 122 of the other battery core assembly 10, to connect the two battery core assemblies 10 in series. The battery core assembly 10 is a battery core assembly 10 as described in any of the foregoing embodiments.

In some embodiments of the present disclosure, the casing 20 is a metal casing, for example, a aluminum casing. It may be formed of other metals as required.

In some embodiments of the present disclosure, the battery 100 is roughly a cuboid, and has a length L, a thickness W and a height H, where the length L is greater than the height H, and the height H is greater than the thickness W. The length of the battery 100 is 400-2500 mm, and the length to height ratio of the battery 100 is 4-21.

It should be noted that the battery 100 being roughly a cuboid means that the battery 100 has a cuboid shape, a cube shape, a roughly cuboid shape or cube shape that is locally irregular, a generally approximate cuboid shape or cube shape that has locally a notch, a bump, a chamfer, an arc portion, or a curved portion.

The present disclosure further provides a battery module, which includes multiple batteries 100 provided in the present disclosure.

The present disclosure further provides a battery pack, which includes multiple batteries 100 provided in the present disclosure or multiple battery modules provided in the present disclosure.

Generally, the number of serially connected electrode core assemblies 12 depends on the output voltage of each electrode core assembly 12, the width of the battery pack and the overall voltage requirement of the battery pack. For example, a type of vehicle requires an output voltage of a battery system of 300 V, and the voltage of a traditional iron-lithium battery is 3.2V. In related art, 100 batteries need to be connected in series in a pack to meet the requirement. In contrast, in the battery pack provided in the present disclosure, assuming that 2 electrode core assemblies 12 are serially connected in one battery core assembly 10, then only 50 battery core assemblies 10 need to be arranged. This greatly reduces the design of the entire pack and the arrangement of the batteries 100, thus making efficient use of the space, and improving the space utilization.

Figure 13:
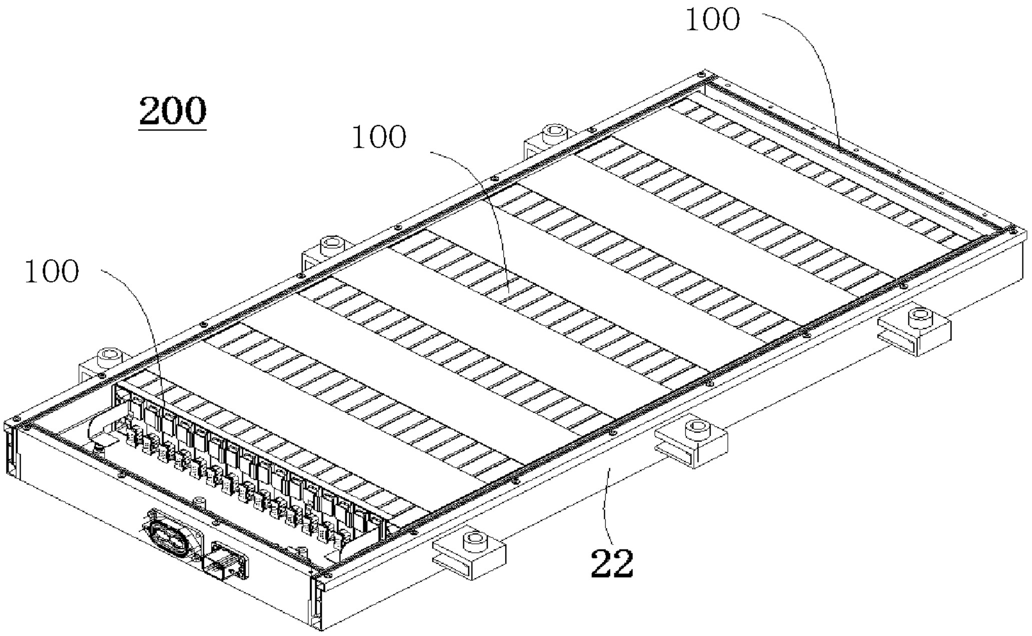
FIG. 13 is a schematic structural view of a battery pack provided in an embodiment of the present disclosure.

Referring to FIG. 13, the battery pack 200 provided in the present disclosure includes a tray 22 and the batteries 100 arranged on the tray 22.

Figure 14:
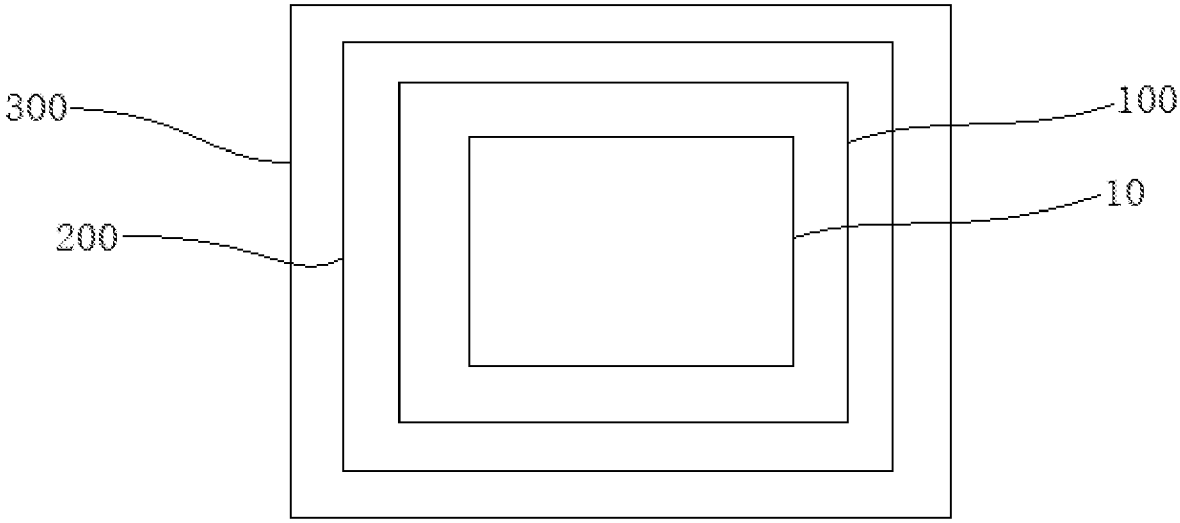
FIG. 14 is a schematic structural view of a vehicle provided in an embodiment of the present disclosure.

The present disclosure further provides a vehicle 300 (see FIG. 14), which includes a battery module or a battery pack 100 provided in the present disclosure.

From the above, it can be seen that the present disclosure has excellent characteristics mentioned above, and has practical use due to the presence of performances that are not found in related art, making the product of the present application become a product of great practical value.

The foregoing descriptions are merely examples of embodiments of the present disclosure, but do not limit the present disclosure. Any modification, equivalent replacement, and improvement made without departing from the idea and principle of the present disclosure shall fall within the protection scope of the present disclosure.

What is claimed is:

1. A battery core assembly, comprising an encapsulation film and electrode core assemblies disposed in the encapsulation film, wherein the electrode core assemblies are connected to form an electrode core string, and each of the electrode core assemblies comprises at least one electrode core;

a first spacer is disposed between two adjacent electrode core assemblies, the first spacer divides an accommodating space inside the encapsulation film into accommodating cavities, cavity walls of the accommodating cavities comprise the first spacer and the encapsulation film connected to the first spacer, and the electrode core assemblies are respectively accommodated in the accommodating cavities; and the first spacer comprises two liquid reservoirs on two opposite sides of the first spacer each communicating with a different one of the accommodating cavities.

2. The battery core assembly according to claim 1, wherein each of the two liquid reservoirs is recessed from an outer surface of the first spacer to an interior of the first spacer.

3. The battery core assembly according to claim 1, wherein a plurality of reinforcing ribs are disposed in one of the two liquid reservoirs to divide the one of the two liquid reservoirs into a plurality of liquid storage units.

4. The battery core assembly according to claim 1, wherein two electrode lead-out members are respectively disposed at two ends of each of the electrode core assemblies an electrode connection hole is provided on the first spacer, and two electrode lead-out members of two adjacent electrode core assemblies having opposite polarities are connected in the electrode connection hole on the first spacer between the two adjacent electrode core assemblies.

5. The battery core assembly according to claim 4, wherein each of the electrode core assemblies comprises at least two electrode cores connected in series or parallel.

6. The battery core assembly according to claim 5, wherein the at least two electrode cores comprise two adjacent electrode cores connected in parallel, and each of the two adjacent electrode cores comprises an electrode core body and two tabs of opposite polarities that are electrically connected to the electrode core body, the two tabs of opposite polarities are respectively arranged at two opposite ends of the electrode core body, tabs with a same polarity of the two adjacent electrode cores are located at a same end;

a tab support is connected to two adjacent tabs with the same polarity of the two adjacent electrode cores; and the tab support is electrically connected to one of the two electrode lead-out members of each of the electrode core assemblies.

7. The battery core assembly according to claim 6, wherein the tab support is connected to the one of the two electrode lead-out members of each of the electrode core assemblies and the two adjacent tabs with the same polarity of the two adjacent electrode cores on different surfaces of the tab support.

8. The battery core assembly according to claim 6, wherein the tab support comprises two first surfaces, and the two first surfaces respectively face the two adjacent tabs with the same polarity and are respectively attached to the two adjacent tabs with the same polarity.

9. The battery core assembly according to claim 8, wherein the tab support is a square piece, and the square piece comprises the two first surfaces, a third surface located between the two first surfaces and facing the electrode core body, and a fourth surface opposite to the third surface; and the tab support is connected to the one of the two electrode lead-out members of each of the electrode core assemblies on the fourth surface.

10. The battery core assembly according to claim 6, wherein the tab support comprises a hollow cavity, the hollow cavity has an opening in at least one of hollow cavity walls, and the opening communicates with one of the accommodating cavities where the tab support is positioned.

11. The battery core assembly according to claim 8, wherein the tab support is a U-shaped piece, the U-shaped piece comprises two opposite side walls and a bottom wall between the two opposite side walls, and outer surfaces of the two opposite side walls are the two first surfaces respectively.

12. The battery core assembly according to claim 11, wherein an opening of the U-shaped piece faces the electrode core body, and the tab support is electrically connected to the one of the two electrode lead-out members of each of the electrode core assemblies on the bottom wall.

13. The battery core assembly according to claim 6, wherein an insulating spacer is disposed between the tab support and the electrode core body.

14. The battery core assembly according to claim 13, wherein the two opposite ends of the electrode core body are V-shaped ends with a tip protruding outward, the two adjacent tabs with the same polarity of the two adjacent electrode cores are respectively located at tips of two V-shaped ends, and a V-shaped space is formed between the two V-shaped ends; and the insulating spacer is a V-shaped piece matching a shape of the V-shaped space, and the V-shaped piece is coupled in the V-shaped space.

15. The battery core assembly according to claim 14, wherein an angle of the V-shaped space is 90-150 degrees; and the insulating spacer is fixed to the tab support by a snap mechanism.

16. The battery core assembly according to claim 1, wherein a second spacer is further disposed at each of two ends of the electrode core string and comprises a second liquid reservoir, the second liquid reservoir is recessed from an outer surface of the second spacer to an interior of the second spacer, and the second liquid reservoir on the second spacer communicates with one of the accommodating cavities.

17. The battery core assembly according to claim 16, wherein at least one tab support in an electrode core assembly is located at at least one end of the electrode core string and comprises a hollow cavity, the hollow cavity has an opening in at least one of hollow cavity walls to communicate with an electrode lead-out hole on the second spacer.

18. The battery core assembly according to claim 16, wherein the second spacer at one end of the electrode core string is mounted around an electrode core assembly at the same end.

19. A battery, comprising a casing and at least one battery core assembly disposed in the casing, wherein the at least one battery core assembly comprises an encapsulation film and electrode core assemblies disposed in the encapsulation film, wherein the electrode core assemblies are connected to form an electrode core string, and each of the electrode core assemblies comprises at least one electrode core;

a first spacer is disposed between two adjacent electrode core assemblies, the first spacer divides an accommodating space inside the encapsulation film into accommodating cavities, cavity walls of the accommodating cavities comprise the first spacer and the encapsulation film connected to the first spacer, and the electrode core assemblies are respectively accommodated in the accommodating cavities; and the first spacer comprises two liquid reservoirs on two opposite sides of the first spacer each communicating with a different one of the accommodating cavities.

20. A battery pack, comprising a plurality of batteries according to claim 19.

21. A vehicle, comprising a battery comprising a casing and at least one battery core assembly disposed in the casing, wherein the at least one battery core assembly comprises an encapsulation film and electrode core assemblies disposed in the encapsulation film, wherein the electrode core assemblies are connected to form an electrode core string, and each of the electrode core assemblies comprises at least one electrode core;

a first spacer is disposed between two adjacent electrode core assemblies, the first spacer divides an accommodating space inside the encapsulation film into accommodating cavities, cavity walls of the accommodating cavities comprise the first spacer and the encapsulation film connected to the first spacer, and the electrode core assemblies are respectively accommodated in the accommodating cavities; and the first spacer comprises two liquid reservoirs on two opposite sides of the first spacer each communicating with a different one of the accommodating cavities.

* * * * *